United States Patent [19]

Wolfe, Jr.

[11] Patent Number: 4,856,974
[45] Date of Patent: * Aug. 15, 1989

[54] INTERNALLY INSULATED EXTRUSION DIE

[75] Inventor: John R. Wolfe, Jr., Rogers, Ark.

[73] Assignee: Rogers Tool Works, Inc., Rogers, Ark.

[ * ] Notice: The portion of the term of this patent subsequent to Jun. 21, 2005 has been disclaimed.

[21] Appl. No.: 203,812

[22] Filed: Jun. 8, 1988

Related U.S. Application Data

[63] Continuation of Ser. No. 865,997, May 22, 1986, Pat. No. 4,752,196.

[51] Int. Cl.$^4$ .................. B29C 47/30; B29C 47/86
[52] U.S. Cl. ............................... 425/67; 264/142; 425/311; 425/313
[58] Field of Search ............... 264/142, 176.1, 178 R; 425/67, 168, 183, 192 R, 196, 313, 311, 382, 382.2, 378.1, 378.2, 379.1, 461, 463, 464

[56] References Cited

U.S. PATENT DOCUMENTS

| | | | |
|---|---|---|---|
| 3,230,582 | 1/1966 | Hoffman et al. | 425/67 |
| 3,271,822 | 9/1966 | Rhino | 425/461 |
| 3,436,449 | 4/1969 | Treu et al. | 264/142 |
| 3,452,394 | 7/1969 | McNeal, Jr. | 425/379.1 |
| 3,516,120 | 6/1970 | Braun et al. | 425/67 |
| 3,599,285 | 8/1971 | Hamilton | 425/307 |
| 3,867,082 | 2/1975 | Lambertus | 425/313 |
| 4,327,050 | 4/1982 | Salmon | 425/67 |
| 4,378,964 | 4/1983 | Wolfe, Jr. | 425/463 |
| 4,516,925 | 5/1985 | Fujita et al. | 425/464 |
| 4,564,350 | 1/1986 | Holmes et al. | 425/464 |
| 4,752,196 | 6/1988 | Wolfe, Jr. | 425/67 |

FOREIGN PATENT DOCUMENTS

| | | |
|---|---|---|
| 246921 A2 | 11/1987 | European Pat. Off. . |
| 2247148 | 4/1973 | Fed. Rep. of Germany . |
| 2517402 | 10/1976 | Fed. Rep. of Germany . |
| 1400426 | 7/1973 | United Kingdom . |
| 1498322 | 1/1978 | United Kingdom . |

Primary Examiner—Jan H. Silbaugh
Assistant Examiner—Jill L. Heitbrink
Attorney, Agent, or Firm—Dickstein, Shapiro & Morin

[57] ABSTRACT

A die assembly for plastic pelletizing apparatus of the type including a cooling bath into which the plastic is extruded. The die assembly includes a heated main body having first and second oppositely disposed exterior faces connected by a plurality of relatively small extrusion passageways. A layer of thermal insulation material overlies the second face, and a cover member having an outer surface adapted to be exposed to the cooling bath is positioned over the thermal insulation material and joined to the main body. Wear resistant insert members formed from a material having a higher coefficient of thermal conductivity than the material from which the cover member is made extend from the outer surface of the cover member through the layer of insulation into the main body. Extrusion outlet orifices are formed through the insert members and define continuations of the extrusion passageways of the main body. The relationship between the inserts, the cover, the insulation, and the main body produces an increased heat flow from the main body to the outer die face in confined areas about the orifices. This heat flow advantageously reduces the possibility of freeze-off and plugging of the orifices due to premature solidification of the extruded plastic.

15 Claims, 2 Drawing Sheets ered to retard the flow
INTERNALLY INSULATED EXTRUSION DIE

CROSS-REFERENCE TO RELATED APPLICATION

This application is a continuation of applicant's copending application Ser. No. 865,997, filed May 22, 1986, which application issued as U.S. Pat. No. 4,752,196 on June 21, 1988.

BACKGROUND OF THE INVENTION

The subject invention is directed to the art of extrusion dies and, more particularly to an extrusion die of the type used for extrusion of synthetic resins and plastics.

The invention is particularly suited for use in an underwater type, plastic pelletizing apparatus and will be described with reference thereto; however, the invention is capable of broader application and could be adapted for use in other environments and for other purposes.

One of the more common apparatuses used for pelletizing plastic materials comprises a rotary extruder which extrudes the resin or plastic material in a molten or fluid state through an extrusion die having a multiplicity of small diameter extrusion passages. Typically, the face of the die is submerged in a cooling bath such that the plastic material solidifies just as it is leaving the die. As the material exits from the face of the die, it is cut into pellets or granules by a rotating knife passing over the die face.

A continuous and ongoing problem with the foregoing apparatus has been the difficulty of assuring that the material does not solidify during its passage through the die. As is apparent, premature solidification of the material can result in plugging or "freezing-off" of the extrusion passages and/or outlet orifices.

In an effort to maintain the material molten during its passage through the die, the dies have typically been designed with internal heating passages through which steam or heated oil has been circulated. In addition, various arrangements have been used to retard the flow of heat from the body of the die to the cooling bath. For example, layers of insulation have been placed over the exposed faces of the die, or between the die face and the main die body. Alternatively, the die passages have been provided with insulating sleeves of ceramic or the like to retard heat flow from the molten plastic to the die body or face.

While the above mentioned approaches have alleviated the difficulty with "freeze-off" to some extent, it still remains an ongoing problem. To that end, the subject invention provides an extrusion die construction which is relatively simple while operating to significantly reduce "freeze-off" and provide extended surface wear life.

BRIEF DESCRIPTION OF THE INVENTION

In accordance with the present invention, a new and improved extrusion die construction is provided wherein a heated main die body having a plurality of plastic extrusion passageways extending through the body to an outer face is provided with a lyaer of thermal insulation over the outer face and a cover member which overlies and encloses the insulation is joined to the main body. Wear resistant insert members formed from a material having a coefficient of thermal conductivity significantly higher than the material from which the cover is made extend through the cover member and the insulation into the main die body. Each of the insert members includes an extrusion outlet orifice which forms a continuation of an associated extrusion passaageway in the main body.

The use of the insert members with their relatively higher coefficient of thermal conductivity increases the heat flow from the main body to the outer surface of the assembly in the area closely surrounding the orifices. This permits the temperature of the orifices to be maintained at a higher level to thereby prevent freeze-off without requiring a significant increase in the heat input to the die body. The remainder of the exposed cover member or face is, however, at a relatively lower temperature because of the insulation.

In accordance with a further aspect of the invention, the outer end faces of the insert members are preferably located in a common plane coextensive with the outer face of the cover member or outwardly thereof. The wear resistant insert members can thus define the surface over which the knife or knives travel to pelletize the extruded plasic.

In accordance with a still further aspect of the invention, the insert members are preferably of cylindrical shape with the outlet orifices formed axially therethrough. In addition, the inserts are preferably bonded to both the main body and the cover member, such as by brazing.

The principal advantage of the subject invention is the provision of a new and improved extrusion die which is arranged to eliminate the problem of freeze-off while providing a highly wear resistant face.

A further advantage resides in the provision of an extrusion die of the general type described that is internally insulated to reduce heat loss to the outer face, but which is provided with means to increase heat flow in the areas about the outlet orifices.

Other benefits and advantages of the subject invention will become apparent to those skilled in the art upon a reading and understanding of the following specification.

BRIEF DESCRIPTION OF THE DRAWINGS

The ivention may take physical form in certain parts and arrangement of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
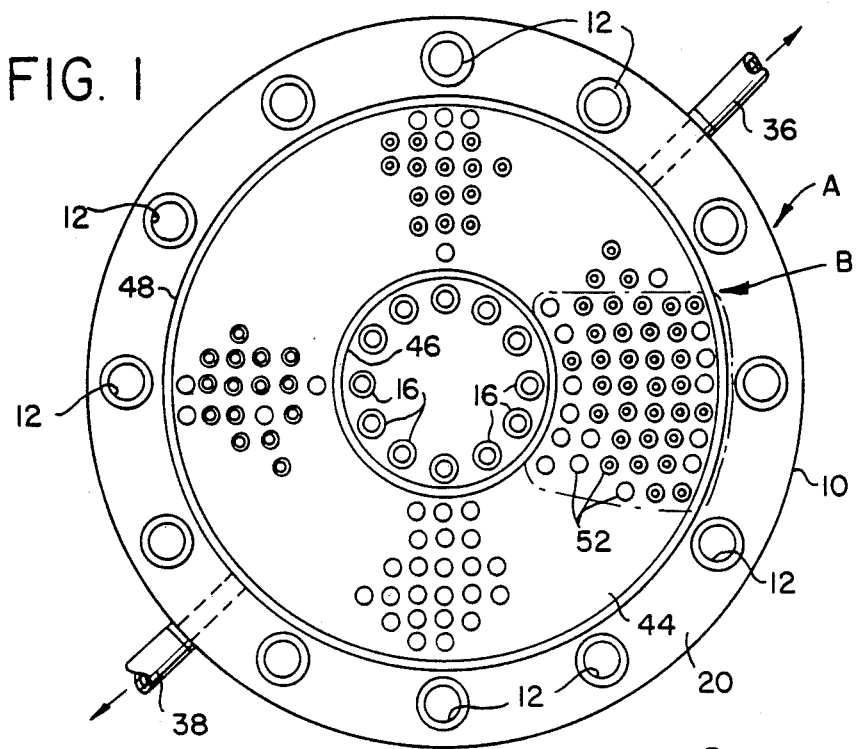
FIG. 1 is a front elevational view of an extrusion die formed in accordance with a preferred embodiment of the invention.
Figure 3:
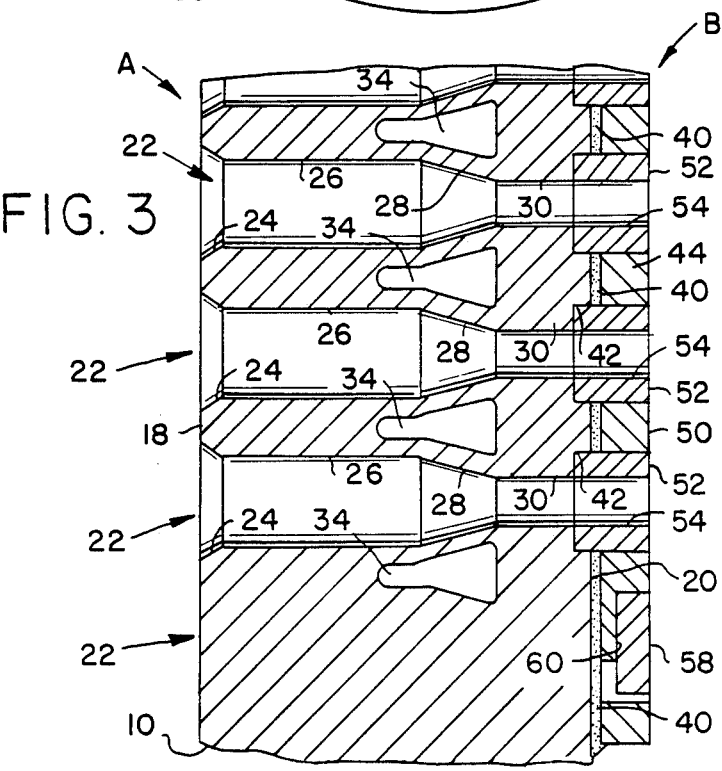
Figure 2:
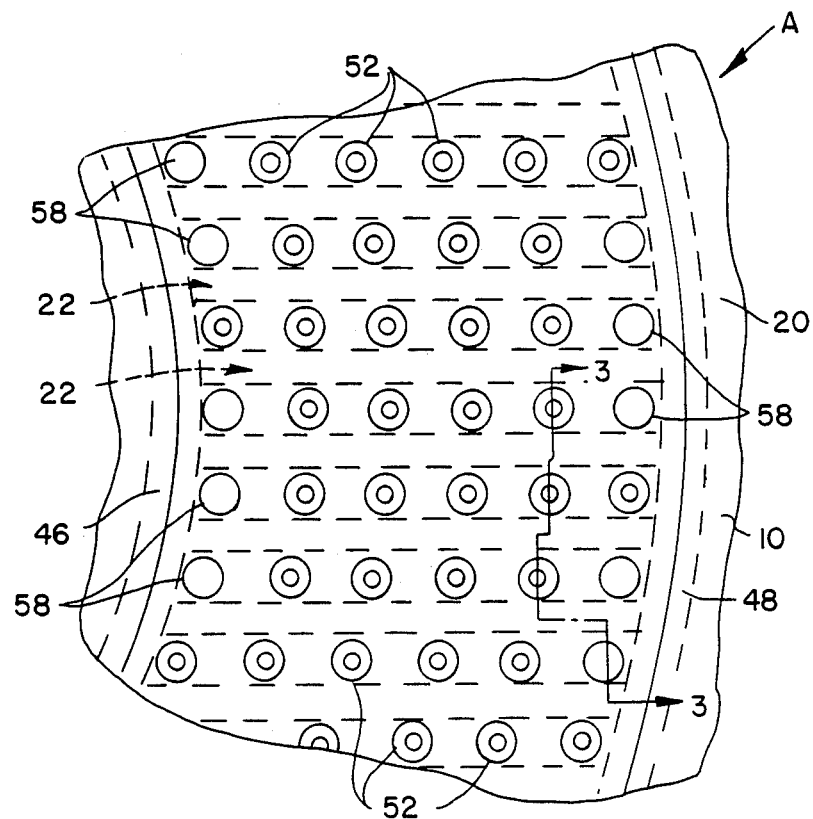
FIG. 2 is an enlarged view of the portion of FIG. 1 enclosed by a dash-dot line; and, FIG. 3 is a cross-sectional view taken generally along lines 2—2 of FIG. 3.

Referring now to the drawings wherein the showings are for the purpose of illustrating a preferred embodiment of the invention only and not for the purpose of limiting same, FIGS. 1-3 show an extrusion die assembly comprising a main die body A and a top plate or cover member B which is connected to the forward end face of the main die body A.

The subject extrusion die assembly is adapted for use with a conventional extruder apparatus which is not shown inasmuch as it does not comprise a part of the present invention and is not necessary to an appreciation thereof. In using the subject invention in its preferred environment, a synthetic resin or polymeric plastic material in molten or fluid form is extruded from the extruder through main die body A and outwardly through cover or top plate member B. The interior of the die body is maintained at an elevated temperature in a manner subsequently to be described.

The outer surface of cover member B is normally disposed in a cooling bath of water or other liquid maintained at a temperature substantially lower than the temperature of the interior of main die body A. As the synthetic resin or polymeric plastic material in a liquid or fluid state is extruded through the main die body A and the cover member B, it is cooled to a solid state as it discharges into the cooling bath. As the solidified material enters the cooling bath, it is cut into pellets by a knife or knives which periodically wipe across the outer surface of cover member B. This general process is well known in the art and is commonly referred to as underwater pelletizing.

More particularly, and with reference to FIGS. 1-3, main die body A is defined by a generally cylindrical body 10 formed from any suitable material, e.g., stainless steel, and provided about its outer periphery with a plurality of counterbored, bolt receiving openings 12 which allow the body 10 to be suitably connected to the associated extruder (not shown). In addition, a plurality of similarly counterbored openings 16 are formed generally axially through body 10 adjacent the center area thereof to also provide for mounting of the assembly.

As best shown in FIG. 3, body 10 includes a pair of oppositely disposed, generally parallel end faces 18 and 20. End face 18 is arranged to be connected to the discharge end of the extruder to receive the molten or fluid resin or plastic material coming therefrom. As shown, a multiplicity of relatively closely spaced, generally parallel extrusion passageways 22 extend in the axial direction through body 10. In the embodiment under consideration, all of the extrusion passageways 22 are generally identical in configuration and include a tapered inlet end opening 24 with an enlarged, generally cylindrical passageway section 26. The inner end of section 26 is provided with a tapered passageway section 28 leading to the outlet section 30 which extends through face 20.

Heating means is provided to maintain the body 10 at an elevated temperature sufficient to prevent solidification of the molten or fluid material during its travel through passageways 22. In the subject embodiment, the heating means comprises a plurality of fluid passages 34 formed transversely of the body intermediate aligned rows of passageways 22. The passages 34 are sealed from passageways 22 and function to conduct a heated fluid such as steam or oil transversely through the die from an inlet 36 to an outlet 38 (see FIG. 1). It should, of course, be understood that the opposite ends of passages are suitably connected to the inlet and outlet 36, 38 by internal header passages (not shown).

In order to prevent excess heat flow from the main body outwardly through end face 20 to the associated cooling bath, the subject die construction includes a layer of suitable thermal insulation material 40 overlying end face 20. Preferably, the insulation 40 substantially completely covers the end face 20 throughout the area under cover member B. As can be appreciated, the particular type of insulation used is not critical to the subject invention and may, for example, comprise a ceramic-type material or any other material which is suitable for high temperature applications and has desirable insulating characteristics. In the embodiment shown, zirconium oxide is preferred and can be sprayed or otherwise applied to surface 40. Additionally, the thickness of the insulation can vary as desired or necessary to provide the needed insulation characteristics.

In the illustrated embodiment, the insulation material 40 is sealed from direct contact with the cooling bath by the top plate or cover member B. As best seen in FIGS. 1 and 3, cover member B comprises a generally flat, annular shaped disk member 44 which is positioned concentrically on end face 20 of body 10. The member 44 is preferably positioned in direct contact with insulation 40, and is rigidly and sealingly joined to body 10 such as by circumferential inner and outer weld beads 46 and 48.

The body 10 and the cover member 44 are preferably formed from metals having suitable temperature and corrosion resistance as required by the operating environment. For example, precipitation hardening stainless steels have been used successfully in die assemblies of the type under consideration.

Of particular importance to the subject invention is the arrangement for connecting the outlet ends of passageways 22 with the outer face 50 of cover member 44. In particular, insert members 52 extend inwardly from outer face 50 through the cover member 44 and the insulation layer 40 into recesses 42 in the main body 10. Each of the inserts 52 preferably has a generally cylindrical configuraiton with an axially extending centerbore 54. In addition, the insert members 52 are formed from a hard, wear resistant material capable of withstanding the abrasion characteristics of the extruded material and the wear induced by the knives traveling over their exposed ends. Moreover, the insert members must be formed from a material having a coefficient of thermal conductivity substantially greater than that of the cover member 44. In the preferred embodiment, the insert members 52 are formed from sintered tungsten carbide having a coefficient of thermal conductivity of about 0.19 cal/cm/sec/°C. A typcial precipitation hardening stainless steel as used for the cover member 44 has a coefficient of thermal conductivity of about 0.050 cal/cm/sec/°C. Other materials having suitable characteristics could, of course, also be used.

One of the insert members 52 is preferably associated with each of the extrusion passageways 22 and defines the outlet discharge orifice for the associated passageway 22. As best shown in FIG. 3, the central opening 54 of the inserts 52 is preferably sized to generally correspond to the diameter of section 30 of the extrusion passageways 22. In addition, each of the insert members 52 is desirably permanently bonded such as by brazing or the like to both the body 10 and the cover member 44.

By directly connecting the insert members 52 through the insulation layer 40 and into thermal engagement with the body 10, heat flow from the body 10 to the outer face 50 is significantly increased in the area closely surrounding each of the discharge orifices 54. This has the effect of raising the temperature of the outlet orifices and preventing freeze-off or solidification of the plastic material passing therethrough.

In addition to the above, it is preferred that the outer end face of each insert 52 lie in a common plane which is preferably in the plane of face 50 or slightly outwardly thereof. The outer ends of the inserts 52 can thus define the surface over which the knives travel in pelletizing the plastic which solidifies as it exits through the outer end of the discharge orifices 54.

Preferably, and as best shown in FIG. 2, the discharge passageway 30 and/or the associated inserts 52 should be laid out such that they are not in circumferentially aligned rows. That is, the wear surfaces provided by the inserts 52 should be relatively evenly distributed at varying radial distances to assure that wear on the knife or knives and the inserts is uniform.

It should be noted that, under certain conditions, the layout of the extrusion passageways 22 is such that the pattern cannot be completely uniform about the outer face of the die assembly. Under such circumstances, it is sometimes desirable to provide a more even wear surface to the outer face than can be achieved by the insert members alone. To that end, the subject invention contemplates the use of suitable wear pads or buttons 58 (see FIGS. 2 and 3) positioned in cover plate member 44 at a location so as to provide a more even distribution of wear areas. Preferably, the wear pads 58 are generally cylindrical and are formed from a suitable, wear resistant material. They are positioned in recesses 60 formed in the cover plate 44 such that the outer or exposed surface of each wear pad 58 lies in the same plane as the outer exposed surfaces of the inserts 52. It is important to note, however, that the wear pads 58 should not extend through the cover member 44 or the insulation layer 40. In addition, it is preferable that time wear pads 58 do not engage the inserts 52. The reason for this is that if engagement with the main die body or the inserts were to take place, the wear pads 58 would cause an increased heat flow to the cooling bath with no benefit to the operation of the die assembly.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An extrusion die assembly for plastic pelletizing apparatus of the type including a cooling bath into which plastic pellets are extruded comprising:
   a main body having first and second oppositely disposed exterior faces;
   a plurality of plastic extrusion passageways extending through said body between said first and second faces;
   a layer of thermal insulation material overlying said second face; means for applying heat to said main body;
   a cover member positioned over said thermal insulation material and joined to said main body, said cover member having an outer surface exposed to said cooling bath and having a plurality of recesses therein;
   wear resistant insert members extending from said outer surface through said cover member and said layer of insulation into said main body, substantially all of said insert members having an outer end lying in a common plane with said outer surface;
   wear pad members mounted on said outer surface of said cover member in said plurality of recesses at locations spaced from said insert members, said wear pad members having an outer surface lying in the plane of said outer ends of said insert members; and,
   extrusion orifices extending through said insert members and forming continuations of said extrusion passageways of said main body.

2. The extrusion die assembly of claim 1 wherein said insert members are positively joined to said cover member and said main body.

3. The extrusion die assembly of claim 1 wherein a separate one of said insert members is associated with each of said passageways.

4. The extrusion die assembly of claim 1 wherrein each said insert member is formed from sintered carbide.

5. The extrusion die assembly of claim 1 wherein said wear pad members are bonded to said cover member.

6. The extrusion die assembly of claim 1 wherein said insert members are bonded to said main body.

7. The extrusion die assembly of claim 1 wherein said insert members have a generally circular configuration and said extrusion orifices extend axially therethrough.

8. A die assembly for use in a plastic pelletizing apparatus of the type including an extruder for extruding molten plastic and an associated cooling bath into which extruded plastic pellets are discharged for cooling comprising:
   a rigid die body having first and second spaced and opppositely disposed faces connected by a plurality of extrusion passages;
   means for connecting said die body member to ssid extruder with said first face positioned to receive molten plastic from said extruder;
   heating means for supplying heat to said die body member;
   a layer of thermal insulation material overlying said second face;
   a cover member connected to said die body member to overlie said insulation and said second face, said cover member having an outer face directly exposed to the cooling bath and a plurality of recesses therein;
   a plurality of wear resistant insert members extending inwardly from the outer face of said cover member through said cover member and said insulation into engagement with said die body, discharge orifices formed through said insert members in communication with said extrusion passages for conveying molten plastic from the passages to the cooling bath, said insert members all having an outer end lying in a common plane; and,
   wear pad members mounted on said outer faces of said cover member in said plurality of recesses at locations spaced from said insert members, said wear pad members having an outer surface lying in said common plane.

9. The die assembly as defined in claim 8 wherein said heating means include passagewaay means formed through said body member and adapted to convey a heating fluid through said die body.

10. The die assembly as defined in claim 8 wherein a separate one of said insert members is associated with each of said passages.

11. The die assembly as defined in claim 8 wherein said outer and lies outwardly of the outer face of said cover member.

12. The die assembly as defined in claim 11 wherein said insert members each have an inner end that extends into said die body.

13. The die assembly as defined in claim 11 wherein said insert members are bonded to said die body and said cover member.

14. The die member assembly as defined in claim 11 wherein said insert members each have a general cylindrical configuration with said discharge orifices extending axially therethrough.

15. The die assembly as defined in claim 14 wherein said insert members have an inner end portion extending into said die body and are bonded therein.

* * * * *

UNITED STATES PATENT AND TRADEMARK OFFICE
CERTIFICATE OF CORRECTION

PATENT NO. : 4,856,974

DATED : August 15, 1989

INVENTOR(S) : John R. Wolfe, Jr.

It is certified that error appears in the above-identified patent and that said Letters Patent is hereby corrected as shown below:

BRIEF DESCRIPTION OF THE INVENTION

Column 1, line 63, change "lyaer" to --layer--.

Column 2, line 5, change "passaageway" to --passageway--; line 22, change "plasic" to --plastic--.

BRIEF DESCRIPTION OF THE DRAWINGS

Column 2, line 45, change "ivention" to --invention--.

DETAILED DESCRIPTION OF THE PREFERRED EMBODIMENT

Column 4, line 32, change "configuraiton" to --configuration--; and line 43, change "typcial" to --typical--.

UNITED STATES PATENT AND TRADEMARK OFFICE
CERTIFICATE OF CORRECTION

PATENT NO. : 4,856,974

DATED : August 15, 1989

INVENTOR(S) : John R. Wolfe, Jr.

It is certified that error appears in the above-identified patent and that said Letters Patent is hereby corrected as shown below:

IN THE CLAIMS

Column 6, line 13, change "wherrein" to --wherein--; line 30, change "opppositely" to --oppositely--; line 59, change "passagewaay" to --passageway--; and line 66, change "and" to --end--.

Signed and Sealed this

Twelfth Day of February, 1991

Attest:

HARRY F. MANBECK, JR.

*Attesting Officer*  *Commissioner of Patents and Trademarks*